US008146806B2

(12) United States Patent
Monk

(10) Patent No.: US 8,146,806 B2
(45) Date of Patent: Apr. 3, 2012

(54) PREPAID NEGATIVE BALANCE FEE PROCESSING AND FEE DIVERSION

(75) Inventor: Justin T. Monk, Parker, CO (US)

(73) Assignee: Visa U.S.A. Inc., San Francisco, CA (US)

( * ) Notice: Subject to any disclaimer, the term of this patent is extended or adjusted under 35 U.S.C. 154(b) by 1338 days.

(21) Appl. No.: 11/757,914

(22) Filed: Jun. 4, 2007

(65) Prior Publication Data

US 2008/0298569 A1 Dec. 4, 2008

(51) Int. Cl.
*G06K 5/00* (2006.01)

(52) U.S. Cl. ............ 235/380; 235/379; 705/35; 705/38; 705/39; 705/43

(58) Field of Classification Search .................. 235/380, 235/379; 705/35, 38, 39, 43
See application file for complete search history.

(56) References Cited

U.S. PATENT DOCUMENTS

| | | |
|---|---|---|
| 5,465,206 A | 11/1995 | Hilt et al. |
| 5,477,038 A | 12/1995 | Levine et al. |
| 5,500,513 A | 3/1996 | Langhans et al. |
| 5,621,201 A | 4/1997 | Langhans et al. |
| 5,815,665 A | 9/1998 | Teper et al. |
| 5,845,070 A | 12/1998 | Ikudome |
| 6,247,129 B1 | 6/2001 | Keathley et al. |
| 6,270,011 B1 | 8/2001 | Gottfried |
| 6,282,522 B1 | 8/2001 | Davis et al. |
| 6,560,581 B1 | 5/2003 | Fox et al. |
| 6,837,425 B2 | 1/2005 | Gauthier et al. |
| 6,915,279 B2 | 7/2005 | Hogan et al. |
| 6,920,611 B1 | 7/2005 | Spaeth et al. |
| 6,957,334 B1 | 10/2005 | Goldstein et al. |
| 7,007,840 B2 | 3/2006 | Davis |
| 7,039,611 B2 | 5/2006 | Devine |
| 7,051,923 B2 | 5/2006 | Nguyen et al. |
| 7,104,446 B2 | 9/2006 | Bortolin et al. |
| 7,111,789 B2 | 9/2006 | Rajasekaran et al. |
| 7,121,456 B2 | 10/2006 | Spaeth et al. |
| 7,124,937 B2 | 10/2006 | Myers et al. |
| 7,136,841 B2 | 11/2006 | Cook |
| 7,152,780 B2 | 12/2006 | Gauthier et al. |
| 7,243,853 B1 | 7/2007 | Levy et al. |
| 7,280,981 B2 | 10/2007 | Huang et al. |
| 2002/0095303 A1* | 7/2002 | Asayama et al. .................. 705/1 |
| 2002/0111919 A1 | 8/2002 | Weller et al. |
| 2002/0194138 A1 | 12/2002 | Dominguez et al. |
| 2003/0004878 A1* | 1/2003 | Akutsu et al. .................... 705/43 |
| 2003/0120593 A1 | 6/2003 | Bansal et al. |
| 2003/0163426 A1* | 8/2003 | Zhang et al. .................... 705/43 |
| 2003/0172040 A1 | 9/2003 | Kemper et al. |
| 2003/0200184 A1 | 10/2003 | Dominguez et al. |
| 2003/0212642 A1 | 11/2003 | Weller et al. |

(Continued)

OTHER PUBLICATIONS

U.S. Appl. No. 11/757,623, Monk.

(Continued)

*Primary Examiner* — Allyson Trail
(74) *Attorney, Agent, or Firm* — Kilpatrick, Townsend & Stockton LLP

(57) ABSTRACT

Systems and methods are provided for a prepaid credit card processing system wherein components or entities such as the acquirer, issuer, or prepaid card processing network can dynamically determine, at the time of the transaction, whether a credit card transaction will be allowed—even where the fee associated with the transaction would cause the balance to fall below zero.

11 Claims, 6 Drawing Sheets

U.S. PATENT DOCUMENTS

| | | |
|---|---|---|
| 2003/0233292 A1 | 12/2003 | Richey et al. |
| 2004/0019522 A1 | 1/2004 | Bortolin et al. |
| 2004/0044621 A1 | 3/2004 | Huang et al. |
| 2004/0050922 A1 | 3/2004 | Gauthier et al. |
| 2004/0054581 A1 | 3/2004 | Redford et al. |
| 2004/0054590 A1 | 3/2004 | Redford et al. |
| 2004/0054591 A1 | 3/2004 | Spaeth et al. |
| 2004/0059688 A1 | 3/2004 | Dominguez et al. |
| 2004/0139021 A1 | 7/2004 | Reed et al. |
| 2004/0148224 A1 | 7/2004 | Gauthier et al. |
| 2004/0153715 A1 | 8/2004 | Spaeth et al. |
| 2004/0220964 A1 | 11/2004 | Shiftan et al. |
| 2005/0021456 A1 | 1/2005 | Steele et al. |
| 2005/0029344 A1 | 2/2005 | Davis |
| 2005/0036611 A1 | 2/2005 | Seaton, Jr. et al. |
| 2005/0045718 A1 | 3/2005 | Bortolin et al. |
| 2005/0058427 A1 | 3/2005 | Nguyen et al. |
| 2005/0071225 A1 | 3/2005 | Bortolin et al. |
| 2005/0071226 A1 | 3/2005 | Nguyen et al. |
| 2005/0071227 A1 | 3/2005 | Hammad et al. |
| 2005/0071228 A1 | 3/2005 | Bortolin et al. |
| 2005/0071235 A1 | 3/2005 | Nguyen et al. |
| 2005/0102234 A1 | 5/2005 | Devine |
| 2005/0121506 A1 | 6/2005 | Gauthier et al. |
| 2005/0149455 A1 | 7/2005 | Bruesewitz et al. |
| 2005/0182724 A1 | 8/2005 | Willard |
| 2005/0246278 A1 | 11/2005 | Gerber et al. |
| 2005/0283416 A1 | 12/2005 | Reid et al. |
| 2005/0283430 A1 | 12/2005 | Reid et al. |
| 2005/0283431 A1 | 12/2005 | Reid et al. |
| 2005/0283432 A1 | 12/2005 | Reid et al. |
| 2005/0283433 A1 | 12/2005 | Reid et al. |
| 2006/0006224 A1 | 1/2006 | Modi |
| 2006/0080243 A1 | 4/2006 | Kemper et al. |
| 2006/0155644 A1 | 7/2006 | Reid et al. |
| 2006/0163345 A1 | 7/2006 | Myers et al. |
| 2006/0178957 A1 | 8/2006 | LeClaire |
| 2006/0179007 A1 | 8/2006 | Davis |
| 2006/0290501 A1 | 12/2006 | Hammad et al. |
| 2006/0293027 A1 | 12/2006 | Hammad et al. |
| 2007/0001000 A1 | 1/2007 | Nguyen et al. |
| 2007/0001001 A1 | 1/2007 | Myers et al. |
| 2007/0005613 A1 | 1/2007 | Singh et al. |
| 2007/0005774 A1 | 1/2007 | Singh et al. |
| 2007/0012764 A1 | 1/2007 | Bortolin et al. |
| 2007/0017970 A1 | 1/2007 | Gauthier et al. |
| 2007/0034679 A1 | 2/2007 | Gauthier et al. |
| 2007/0055597 A1 | 3/2007 | Patel et al. |
| 2007/0055630 A1 | 3/2007 | Gauthier et al. |
| 2007/0057034 A1 | 3/2007 | Gauthier et al. |
| 2007/0057051 A1 | 3/2007 | Bortolin et al. |
| 2007/0083465 A1 | 4/2007 | Ciurea et al. |
| 2007/0100691 A1 | 5/2007 | Patterson |
| 2007/0125842 A1 | 6/2007 | Antoo et al. |
| 2010/0070359 A1* | 3/2010 | Heasley et al. ............ 705/14.17 |
| 2010/0145818 A1* | 6/2010 | Udiani ............ 705/26 |
| 2011/0029431 A1* | 2/2011 | Knapp ............ 705/39 |
| 2011/0082792 A1* | 4/2011 | Ballard et al. ............ 705/44 |

OTHER PUBLICATIONS

U.S. Appl. No. 11/757,837, Monk.
U.S. Appl. No. 11/757,980, Monk.
U.S. Appl. No. 11/757,983, Monk.
U.S. Appl. No. 11/757,893, Monk.
U.S. Appl. No. 11/757,985, Monk.

* cited by examiner

| Fee ID | Fee Type | Description | Range | | Amount for Standard Fee Table | | Amount for this Fee Table | |
|---|---|---|---|---|---|---|---|---|
| | Company Account | the load. | 11+ | times | $6.00 | N/A | $6.00 | N/A |
| 1063 | ACH Value Reload - Deposit | Fee to cardholder account for loading an individual card via ACH. | 1 - 6 - 11+ | 5 times 10 times times | $2.00 $4.00 $6.00 | N/A N/A N/A | $2.00 $4.00 $6.00 | N/A N/A N/A |

Transaction Fees
Fees for card transactions

| Fee ID | Fee Type | Description | Range | | Amount for Standard Fee Table | | Amount for this Fee Table | |
|---|---|---|---|---|---|---|---|---|
| | | | | | On-Us | Foreign | On-Us | Foreign |
| 1021 | ATM Balance Inquiry - Domestic | Fee to the Cardholder for a balance inquiry transaction from a domestic ATM. | 1 - 6 + | 5 times times | $1.50 $2.50 | $2.25 $3.25 | $1.95 $2.95 | $2.50 $3.50 |
| 1031 | ATM Balance Inquiry - International | Fee to the cardholder for a withdrawal transaction from an international (non-US) ATM. | 1 - 9 + | 8 times times | $0.50 $0.75 | $0.75 $1.25 | $0.75 $1.00 | $1.00 $1.25 |
| 1022 | ATM Withdrawal - Domestic | Fee to the Cardholder for a withdrawal transaction from a domestic ATM. | 1 - 6 + | 5 times times | $1.50 $2.50 | $2.25 $3.25 | $1.95 $2.95 | $2.50 $3.50 |
| 1032 | ATM Withdrawal - International | Fee to the cardholder for a balance inquiry transaction from an international (non-US) ATM. | 1 - 11+ | 10 times times | $0.50 $0.75 | $0.75 $1.25 | $1.00 $2.00 | $3.00 $4.00 |
| 1023 | Teller Cash - Domestic | Fee to the cardholder for a Teller Cash transaction from a US merchant. | 1 - 6 + | 5 times times | $1.50 $2.50 | $2.25 $3.25 | $1.95 $2.95 | $2.50 $3.50 |
| 1033 | Teller Cash - International | Fee to the cardholder for a Teller Cash transaction from a non-US merchant. | 1 - 11+ | 10 times times | $0.50 $0.75 | $0.75 $1.25 | $1.00 $2.00 | $3.00 $4.00 |
| 1024 | Purchase w/Cash Back - Domestic | Fee to the cardholder for a purchase with cash back transaction from a US merchant. | 1 - 6 + | 5 times times | $1.50 $2.50 | $2.25 $3.25 | $1.95 $2.95 | $2.50 $3.50 |
| 1034 | Purchase w/Cash Back - International | Fee to the cardholder for a purchase with cash back transaction from a non-US merchant. | 1 - 11+ | 10 times times | $0.50 $0.75 | $0.75 $1.25 | $1.00 $2.00 | $3.00 $4.00 |
| 1025 | Signature Quasi Cash - Domestic | Fee to the cardholder for a Signature Quasi Cash transaction from a US merchant. | 1 - 6 + | 5 times times | $1.50 $2.50 | $2.25 $3.25 | $1.95 $2.95 | $2.50 $3.50 |
| 1035 | Signature Quasi Cash - International | Fee to the cardholder for a Signature Quasi Cash transaction from a non-US merchant. | 1 - 11+ | 10 times times | $0.50 $0.75 | $0.75 $1.25 | $1.00 $2.00 | $3.00 $4.00 |
| 1026 | ATM Mini Statement | Fee to the cardholder for an ATM mini-statement printed at a participating ATM | 1 - 9 + | 8 times times | $0.50 $0.75 | $0.75 $1.25 | $0.75 $1.00 | $1.00 $1.25 |
| 1027 | Currency Conversion | Fee to the cardholder for a currency conversion. | 1 - 9 + | 8 times times | 0.75% 0.65% | 1.00% 0.75% | 0.75% 0.65% | 1.00% 0.75% |
| 1028 | PIN POS Purchase - Domestic | Fee to the cardholder for a PIN POS purchase from a US merchant. | 1 - 9 + | 8 times times | $0.50 $0.75 | $0.75 $1.25 | $0.75 $1.00 | $1.00 $1.25 |
| 1036 | PIN POS Purchase - International | Fee to the cardholder for a PIN POS purchase from a non-US merchant. | 1 - 11+ | 10 times times | $0.50 $0.75 | $0.75 $1.25 | $1.00 $2.00 | $3.00 $4.00 |
| 1029 | PIN Quasi Cash - Domestic | Fee to the cardholder for a Quasi Cash transaction from a US merchant. | 1 - 9 + | 8 times times | $0.50 $0.75 | $0.75 $1.25 | $0.75 $1.00 | $1.00 $1.25 |
| 1037 | PIN Quasi Cash - International | Fee to the cardholder for a Quasi Cash transaction from a non-US merchant. | 1 - 11+ | 10 times times | $0.50 $0.75 | $0.75 $1.25 | $1.00 $2.00 | $3.00 $4.00 |
| 1030 | Signature POS Purchase - Domestic | Fee to the cardholder for a signature purchase from a US merchant. | 1 - 9 + | 8 times times | $0.50 $0.75 | $0.75 $1.25 | $0.75 $1.00 | $1.00 $1.25 |
| 1038 | Signature POS Purchase - International | Fee to the cardholder for a signature purchase from a non-US merchant. | 1 - 11+ | 10 times times | $0.50 $0.75 | $0.75 $1.25 | $1.00 $2.00 | $3.00 $4.00 |
| 1039 | ATM Decline - Domestic | Fee to the Cardholder for a declined ATM withdrawal transaction from a US-based ATM. | 1 - 11+ | 10 times times | $1.95 $2.95 | $1.95 $2.95 | $1.00 $2.00 | $3.00 $4.00 |
| 1040 | ATM Decline - International | Fee to the Cardholder for a declined ATM withdrawal transaction from a non-US ATM. | 1 - 11+ | 10 times times | $0.50 $0.75 | $0.75 $1.25 | $1.00 $2.00 | $3.00 $4.00 |
| 1041 | PIN POS Decline - Domestic | Fee to the cardholder for a PIN POS decline from a US merchant. | 1 - 11+ | 10 times times | $1.95 $2.95 | $1.95 $2.95 | $1.00 $2.00 | $3.00 $4.00 |
| 1042 | PIN POS Decline - International | Fee to the cardholder for a PIN POS decline from a non-US merchant. | 1 - 11+ | 10 times times | $0.50 $0.75 | $0.75 $1.25 | $1.00 $2.00 | $3.00 $4.00 |
| 1043 | Signature POS Decline - Domestic | Fee to the cardholder for a Signature POS decline from a non-US merchant. | 1 - 11+ | 10 times times | $1.95 $2.95 | $1.95 $2.95 | $1.00 $2.00 | $3.00 $4.00 |
| 1044 | Signature POS Decline - International | Fee to the cardholder for a Signature POS decline from a non-US merchant. | 1 - 11+ | 10 times times | $1.95 $2.95 | $1.95 $2.95 | $1.95 $2.95 | $1.95 $2.95 |

Other Fees
Fees for maintenance or services

| Fee ID | Fee Type | Description | Range | Amount for Standard Fee Table | Amount for this Fee Table |
|---|---|---|---|---|---|
| 1004 | Annual Membership | Annual fee to the Cardholder for maintenance of the prepaid account. | None | $25.00 | $25.00 |
| 1005 | Inactive Account | Fee to cardholder for account inactivity. | 1 - 2 months 3 - 6 months 6 + months | $2.00 $3.00 $4.00 | $2.50 $3.50 $4.50 |

FIG. 2

| Your Financial Institution Payroll Card | Program Documents :: Home :: Help :: Sign out |

| ▸ Search For_ | ▸ Card Sales | ▸ Work Queues | ▸ Manage Program | ▸ Reports | ▸ Risk Management |

:: Fee Detail
Home > Fees > Fee Detail      <Room for system messages>

☑ Overview
Search Fee Tables
Fee Table Detail
Fee Detail

Program Information:
Issuer: Your Financial Institution    Card Program:    Reloadable Gift Card
Location: Branch 1    Fee Table Type:    Standard Fee Tab

Fee Information
Fee ID: 1061    Individual / Company:    N/A - General
Fee Name: Gift-Giver Value Reload - Cash/Check
Card Type: Reloadable Only Trigger: Per Event    Fee Starting Point:    N/A
Frequency: Per Reload    Fee Applied:    Upon Reload
Range Type: Count    Charge to:    Funding Source
Reset Period: [Day, Week, Month, Year]

Fee Notes:

Fee Ranges

| Range || This Table ||
| From | To | On-Us | Foreign |
|---|---|---|---|
| 1 | 5 | $2.00 | N/A |
| 6 | 10 | $4.00 | N/A |
| 11 | Unlimited | $6.00 | N/A |

Fee Diversion

| Frequency | Reset Period | Count to be Diverted |
|---|---|---|
| | | Not Allowed for this Fee |

Negative Balance Option
Selection (* = Default):    Definition:
◉ Not Applicable for this fee type
○ Yes - Allow Negative Balance    Allows requested activity to take place without regard for general ledger balance. As a result the full fee is applied and the fee assessment operations may cause the general balance to become negative.
○ No - Disallow Negative Balance - Partial Fee Allowed    Allows requested activity to take place but ensures that the current ledger balance does not fall below zero due to the fee assessment operations. As a result only a portion (or none) of the intended fee may be assessed.
○ No - Disallow Negative Balance - Full Fee Required    Full fee will be assessed. Authorization and Service Transactions will be denied. Other Fee types will bypass charging the fee.

Fees Not Charged In These States

| ☐ AK | ☐ CT | ☐ ID | ☐ LA | ☐ MS | ☐ NH | ☐ OR | ☐ TN | ☐ WV |
| ☐ AL | ☐ DE | ☐ IL | ☐ ME | ☐ MO | ☑ NJ | ☐ OK | ☐ TX | ☐ WI |
| ☐ AZ | ☐ DC | ☐ IN | ☐ MD | ☐ MT | ☐ NM | ☐ PA | ☐ UT | ☐ WY |
| ☐ AR | ☐ FL | ☐ IA | ☐ MA | ☐ NC | ☐ NY | ☐ RI | ☐ VT | |
| ☑ CA | ☐ GA | ☐ KS | ☐ MI | ☐ ND | ☐ NV | ☐ SC | ☐ VA | |
| ☐ CO | ☐ HI | ☐ KY | ☐ MN | ☐ NE | ☐ OH | ☐ SD | ☐ WA | |

[BACK]

FIG. 6

PREPAID NEGATIVE BALANCE FEE PROCESSING AND FEE DIVERSION

FIELD OF THE INVENTION

This invention relates, in general, to payment cards such as but not limited to prepaid credit cards.

BACKGROUND

Prepaid credit cards, such as payroll and general spend cards, offer a solution to underbanked and nonbanked consumers. For example, prepaid credit cards have been developed to be used by employers as an alternative to direct deposit for unbanked employees. Such cards for example, may be used to pay bills, or use PIN-based technology through one or more point of sale (POS) or ATM networks.

However, there are fees associated with prepaid cards. For example, fees may be charged for transaction events such as withdrawing money from an ATM, ATM balance inquiries, POS purchases or other types of transactional activities.

As recognized by the present inventor, when the prepaid account approaches zero, the fee associated with a transaction event may cause the card balance to drop below zero. In this instance, the transaction would be denied, even if there were sufficient funds to complete the transaction alone.

It is against this background that the various embodiments of the present invention were developed.

SUMMARY

According to one broad aspect of one embodiment, disclosed herein is an apparatus for negative balance processing of a prepaid card. The apparatus may comprise a database for storing a fee criteria associated with the prepaid card and cardholder data associated with the prepaid card; a processing engine that receives transaction data from a transaction event associated with the prepaid card, receives prepaid card data from the database and compares the card data to the transaction data in order to selectively determine whether the transaction is allowed, disallowed, allowed with a partial fee or allowed with the fee diverted to an associated diversion account.

According to another broad aspect of one embodiment, disclosed herein is a method for processing a prepaid card. The method may comprise accessing prepaid card data associated with the prepaid card. The prepaid card data comprises at least a card balance and a fee criteria. The method further comprises receiving transaction data from a transaction event associated with the prepaid card. The prepaid card data may be compared to the transaction data and based on the comparison between the prepaid card data and the transaction data, the criteria from the associated fee criteria may be applied in order to selectively determine whether the transaction is allowed, disallowed, allowed with a partial fee or allowed with the fee diverted.

BRIEF DESCRIPTION OF THE DRAWINGS

FIG. 2 illustrates an example of a graphical user interface that may be used to access fees associated with a prepaid card in accordance with one embodiment of the invention.

FIG. 6 illustrates an example of a graphical user interface that may be used to define a negative balance option in accordance with one embodiment of the present invention.

DETAILED DESCRIPTION

Embodiments presented herein relate to a prepaid credit card processing system wherein components or entities such as the acquirer, issuer, or prepaid card processing network can dynamically determine, at the time of the transaction, whether a credit card transaction will be allowed—even where the fee associated with the transaction would cause the balance to fall below zero.

As used herein, the term "card" includes but is not limited to, for example, bank cards, prepaid, preloaded or prefunded cards, such as general purpose reloadable cards, travel cards, payroll cards, teen or student cards, commercial cards, gift cards, or any other type of preloaded, prefunded or prepaid conventional payment card that a customer can use in lieu of a cash payment, and these terms are used interchangeably herein. The term "transaction" includes but is not limited to bill pay, point-of-service purchase, ATM withdrawal, balance inquiry, or any other purchase type activity through prepaid card usage. The term "cardholder" includes but is not limited to, for example, a cardholder of any type of credit card (as that term is used herein), a customer or account holder, and these terms are used interchangeably herein. The term "acquirer" includes but is not limited to the merchant's payment processor, the merchant's bank or financial institution who acquires transactions from merchants and routes messages, authorizations or clearing drafts between merchants and a prepaid card processing network, and these terms are used interchangeably herein. The term "issuer" includes but is not limited to a bank or other financial institution that issues the prepaid cards. The term "prepaid card processing network" or "processing network" includes but is not limited to an electronic payment system, or any conventional network or system for authorizing or processing electronic payments and/or settling such payments between entities in a prepaid card system.

Generally, an issuer may configure each card or card program with a set of associated fees. For example, the issuer may charge fees for membership, ATM balance inquiry, ATM withdrawal, POS purchase, maintenance fees, and other operational type transactions. In the case of a prepaid card that is approaching a zero balance, even where there are sufficient funds to cover the transaction itself, such as an ATM withdrawal for a designated amount, the fee associated with the service may be sufficient to cause the balance to fall below zero. Traditionally, under these circumstances, the prepaid card processing network would disallow the transaction due to insufficient funds.

Figure 1:
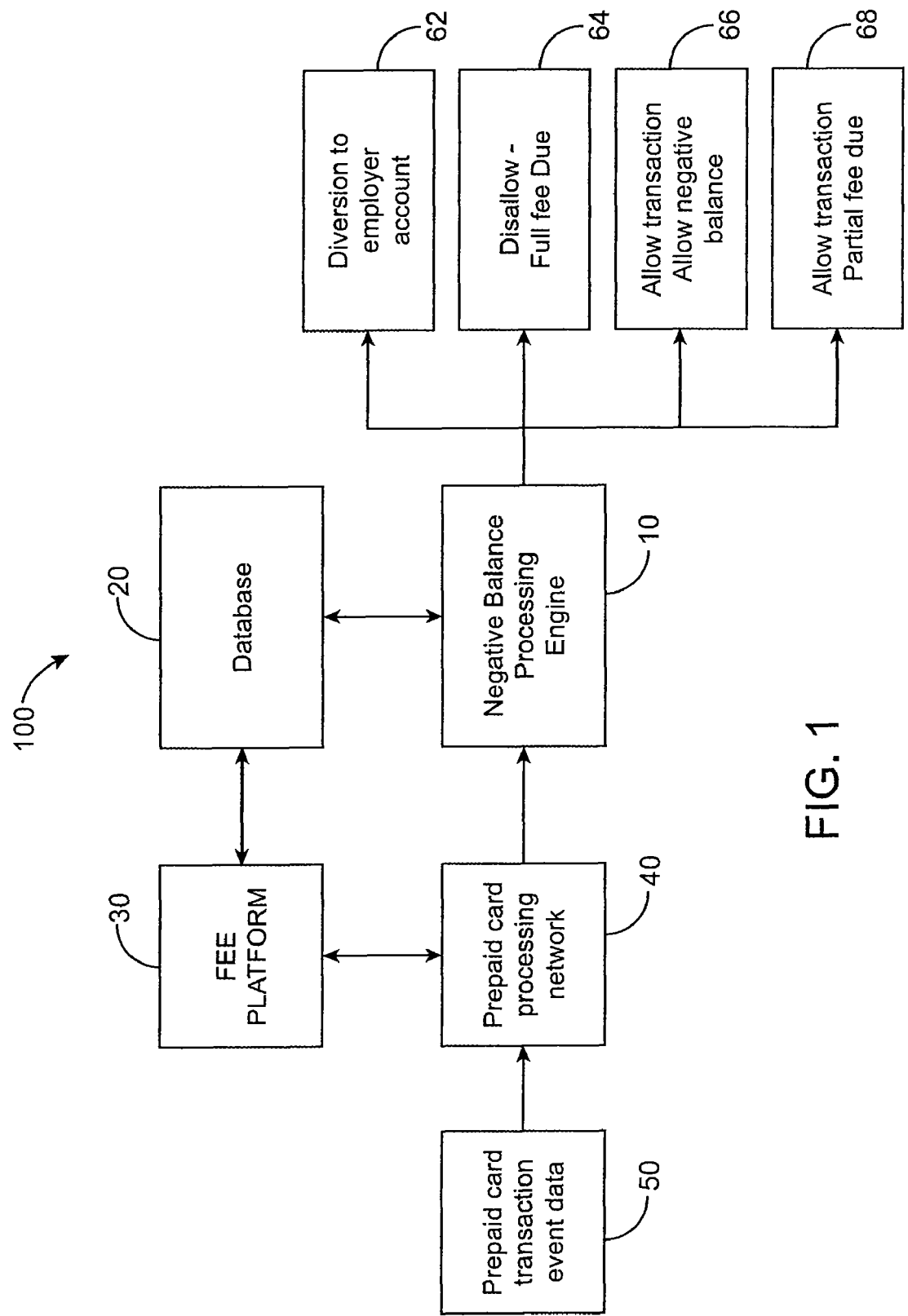
FIG. 1 illustrates a block diagram of one example of a system for processing a negative balance situation for a prepaid card in accordance with one embodiment of the present invention.

Referring to FIG. 1, FIG. 1 illustrates an example of a block diagram for determining whether to authorize a transaction where the fee associated with the transaction is sufficient to cause the card balance to fall below zero. In FIG. 1, the issuer is provided with a processing engine 10 for dynamically and in real-time determining whether a particular card transaction will be allowed, disallowed, allowed with a partial fee, or allowed with the fee portion being diverted.

In FIG. 1, the system 100 may comprise a processing engine 10, a database 20 integrated with or in communication with a fee criteria which may be in the form of a fee database or platform 30. For example, a client configuration form that indicates the issuer's fee schedule for a card program may be executed by the fee platform 30. The fee platform 30 may further be in communication with the processing engine 10 directly or through the database 20. Fee platform 30 may be in communication with or integrated with a prepaid card processing network 40. The processing engine 10 may also be in communication with (or integrated with) prepaid card processing network 40, which receives transaction data 50 for the originating prepaid card transaction event. The processing engine 10 automatically compares the prepaid card data (e.g., stored in database 20) with the transaction data 50 and applies the fee criteria associated with the card according to the result of the comparison between the prepaid card data and the transaction data in order to selectively determine whether and at what extent to authorize the transaction. The process may further be implemented as a process, logic or rules within a computing or electronic device.

One example of a prepaid card that may use negative balance processing is a payroll card. A payroll card is an option for an employer to provide to underbanked or non-banked employees as an alternative, for example, for direct deposit or written paychecks.

In various embodiments, as used herein, the term employer may be used to refer to alternative embodiments. For example, the term employer may be used to generally refer to an entity or person/persons responsible for loading the card. For example, negative balance processing may be similar for prepaid cards established to provide government granted benefits, including but not limited to social security benefits, disability payments, Medicare/Medicaid, and welfare payments. In this instance, the term employer would refer to a government agency.

In further embodiments, the term employer may refer to a person or entity that is responsible for loading the card such as, a parent that loads a spend card for a college student.

In various embodiments, the prepaid card transaction event may be an event that triggers a fee within the fee criteria. For example, a POS transaction, bill pay, ATM inquiry, ATM withdrawal, or other transactional or operational type event. According to the fee criteria designated by the issuer, each event may be associated with a fee.

As illustrated in FIG. 1, the transaction data 50 from the prepaid card transaction event may be communicated to the prepaid card processing network 40. Transaction data 50 may comprise for example, a transaction type, a transaction amount, a card holder name, a card identification that identifies the fee platform 30 associated with the card or card program, a merchant name and/or identifier, and any other associated transactional information. The transaction data 50 may further be communicated to the processing engine 10.

The processing engine 10 may receive or access card holder records stored by the database 20 and compare the data from the database 20 to the prepaid card transaction data 50 in order to determine authorization of the transaction. The database 20 may be implemented using any conventional database technology. The database 20 may comprise one or more fields for card holder data such as for example, name, address, phone number, transaction history, and card/account number. In one example, the database 20 may integrate a fee criteria/platform 30 or communicate with the fee criteria/platform. In this way, the database 20 has access to the fee criteria associated with the card or card program.

In one embodiment, the fee platform 30 is implemented between the issuer and the prepaid card processing network 40 during the initial implementation process and may be configured by the issuer to correspond uniquely to a particular card or card program. The fee platform 30 directs the fee criteria on a fee-by-fee basis for the card. In various embodiments, the issuer may structure the fee platform 30 according to any number of variables. For example, the fee platform 30 may contain one or more fields such as fee types charged for a particular card program, for instance, a membership or initiation fee, maintenance fee, ATM withdrawal fee, etc. In another example, the issuer may determine the triggering event for the fee, for instance, card purchase, card maintenance, ATM withdrawal, ATM inquiry, etc. In another example, within each field the issuer may determine the frequency of fees charged, for instance, fee charged per occurrence, per month, per year, etc. In yet another example, within each field the issuer may determine the range type for a card program, for instance, the issuer may configure multiple fee amounts based on how many times that fee occurs. For example, the first two ATM withdrawals are charged a fee of $1.00. The next three withdrawals are charged a fee of $2.00 and the next three withdrawals are charged a fee of $3.00. Further, each range may further comprise a range reset period, for instance, the card fee structure may be reset daily, weekly, monthly, yearly, etc.

As shown in FIG. 2, in one example, a graphical user interface (GUI) may be used to access a number of fields associated with fee type. For example, fees may be charged for ATM Balance Inquiry (the fee to the card holder for a balance inquiry transaction from an ATM), ATM Withdrawal (the fee to the card holder for a withdrawal transaction from an ATM), Teller Cash Withdrawal (The fee to the card holder for a teller cash transaction from a merchant), and PIN POS purchase (the fee to the card holder for a PIN POS purchase from a merchant) to name a few.

As shown, the fee range may further be subdivided based on number of times per fee type. For example, for the first 1-5 times, the fee may be $1.50 and for each subsequent action related to that fee type the fee may be $2.50.

The fields for various fee criteria may further incorporate instructions for fee payment. For example, in one embodiment, the employer, to incentivize its workers to enroll in a payroll program may elect to pay for at least some of the cardholder fees that are charged by the issuer. For example, the employer may establish one or more diversion accounts associated with one or more cards or card programs. The diversion accounts may be established to pay employer elected cardholder fees; for instance, the employer may pay an initiation fee, and/or two ATM transaction fees.

In one example, the issuer may configure the fee criteria to allow one free ATM transaction per month. The employer may elect to subsidize two additional ATM transactions for that monthly period. In operation, when the employee makes an ATM withdrawal, the ATM fee is triggered according to the criteria designated in the fee platform 30. Within the fee platform 30, an additional fee criteria may be associated with the triggered fee. In processing the transaction, the processing engine 10 applies the fee according to the criteria designated in the fee platform 30. For example, for the second or third transaction the fee may be diverted to an employer diversion account associated with the card. In this instance, settlement of the fees occurs between the issuer and the employer.

In another example, a comparison may be performed to check the prepaid card balance received from the database 20 against the transaction amount to ensure that there are adequate funds in the card account to cover the transaction amount and the fee associated with the transaction event. In some cases there are adequate funds in the prepaid card account to cover the transaction amount but not the fee. That is, the fee would cause the prepaid card balance to fall below zero. This is referred to herein as negative balance processing. In various embodiments, the fee criteria may be configured with at least four options for negative balance processing. For example, as shown in option 62 of FIG. 1, an employer may designate an employer account to receive the fee portion of a transaction for one or more fee types where the fee would cause the card balance to fall below zero. In another option 64, the fee platform 30 may be configured to disallow a transaction for a particular fee type for insufficient funds. In another option 68, the fee platform 30 may be configured to allow a transaction and dynamically change the fee for the specified fee type to the remaining balance after the transaction amount (i.e., charge a partial fee). In another option 66, the fee platform 30 may be configured to allow the transaction and allow the account balance to fall below zero by the partial or full fee amount.

Figure 3:
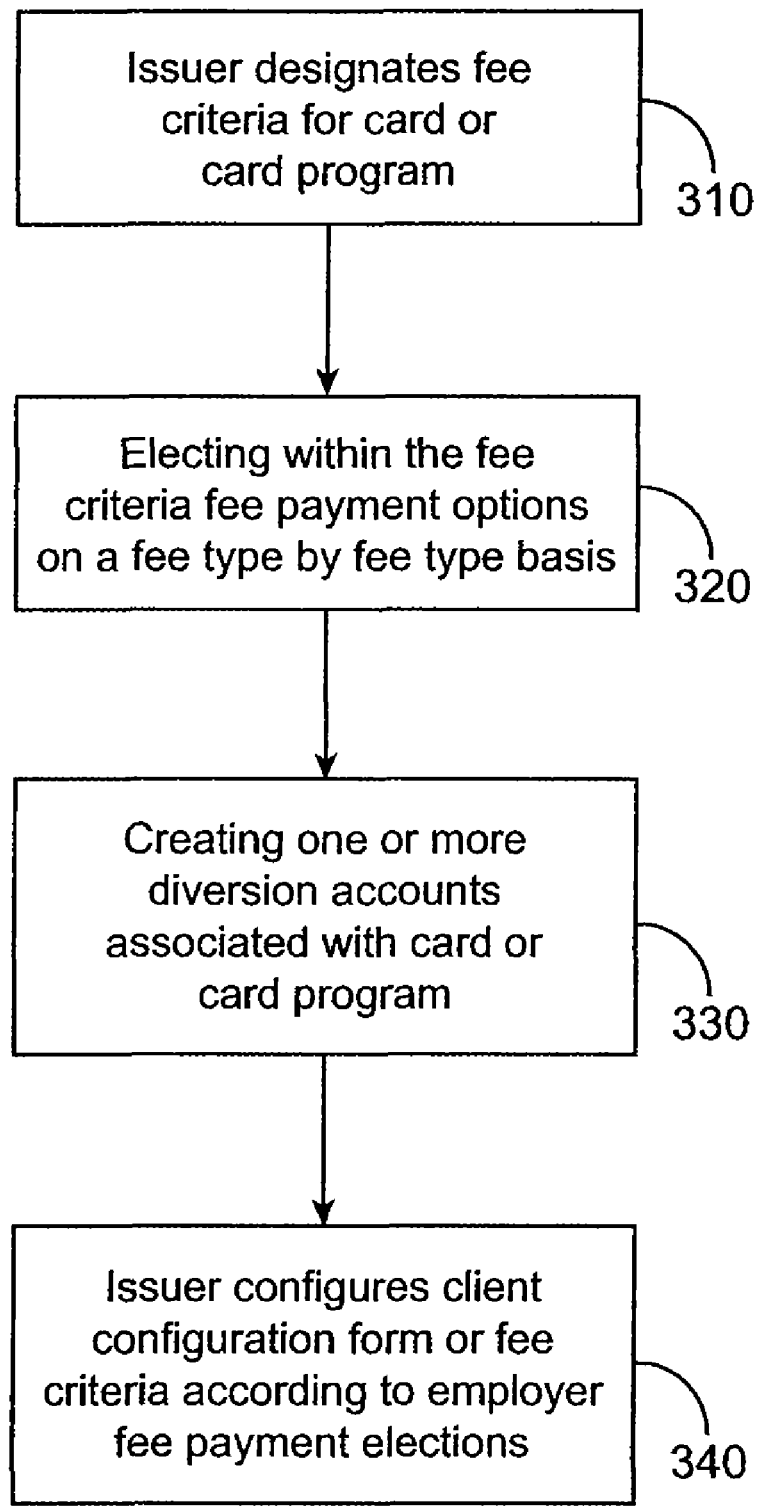
FIG. 3 illustrates an example of operations for configuring a fee criteria in accordance with one embodiment of the present invention.

FIG. 3, illustrates an example of logical operations for providing employer diversionary accounts. In one embodiment, the employer may elect to pay for certain fees related to negative balance processing. At a first operation 310, the issuer designates a fee criteria for a card or card program. In one example, the fee criteria may comprise fee amounts per fee type. The fee amounts may comprise further criteria on a fee type by fee type basis, for example, frequency charged for each fee type, ranges within each fee type or designation. At a second operation 320, an employer may elect within each fee type whether to pay fees on behalf of an employee. For example, the employer may elect to pay ATM withdrawal fees in a negative balance situation. In a further embodiment, the employer may elect to pay only certain fee types (for instance, fees for ATM withdrawal but not fees for balance inquiry), where the trigger for payment is predefined for example, the trigger may be a negative balance situation. In a third operation 330, to accommodate payment of fee types, the employer may link one or more diversion accounts associated to a card or card program. In a fourth operation 340, the issuer configures the fee criteria according to the employer fee payment elections, including for example, election of fee types, fee trigger events, and diversion of certain fee types according to preset triggers.

As further shown in FIG. 1, in alternate embodiments, the issuer may configure the fee platform 30 with respect to negative balance processing in cases where a diversionary account does not apply. In various embodiments, the issuer can determine on a fee-by-fee basis how to proceed with the transaction. For example, for each fee type (i.e., ATM withdrawal, ATM balance inquiry, POS sale, etc.) the issuer may configure the fee platform 30 to direct the processing engine 10 to selectively determine whether the transaction proceeds by one of: allow the transaction and allow the card balance to fall below zero (66); require the full fee and disallow the transaction due to insufficient funds (64); or allow the transaction and dynamically change the fee, i.e., allow a partial fee (68).

Referring to FIG. 1, the fees may be triggered by a transaction event and charged according to the criteria in the fee platform 30. According to the fee platform 30, the fees may be assessed to the card holder account, the employer account, and the issuer (for example, a promotional fee).

Figure 4:
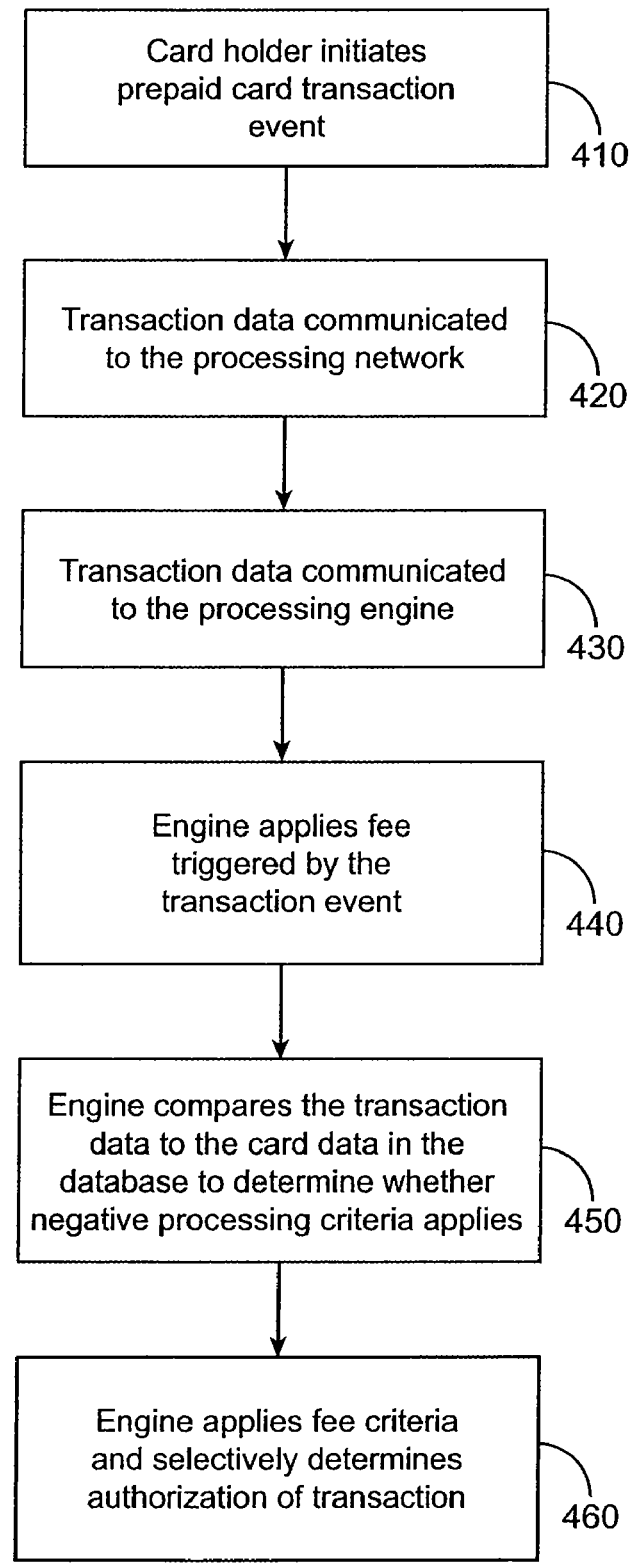
FIG. 4 illustrates an example of operations for determining whether negative balance criteria applies in accordance with one embodiment of the present invention.

FIG. 4 illustrates an example of logical operations for negative balance processing. In a first operation 410, the card holder initiates a prepaid card transaction event. In one example, the transaction event may be a POS purchase for a transaction amount. In a second operation 420, the transaction data (for example, the transaction amount and card holder data) may be communicated to the prepaid card processing network. At a third operation 430, the processing network communicates the transaction data to the processing engine. At a fourth operation 440, the processing engine retrieves the fee triggered by the transaction event and any further fee criteria from the database and/or fee platform. The processing engine may further receive a card balance from the database. At a fifth operation 450, the processing engine compares the transaction data to the card data received from the database to determine whether negative processing criteria apply. In a sixth operation 460, the processing engine applies the fee criteria to determine whether the transaction is allowed and the account balance falls below zero, allowed for partial fee, allowed with the fee diverted or declined.

Figure 5:
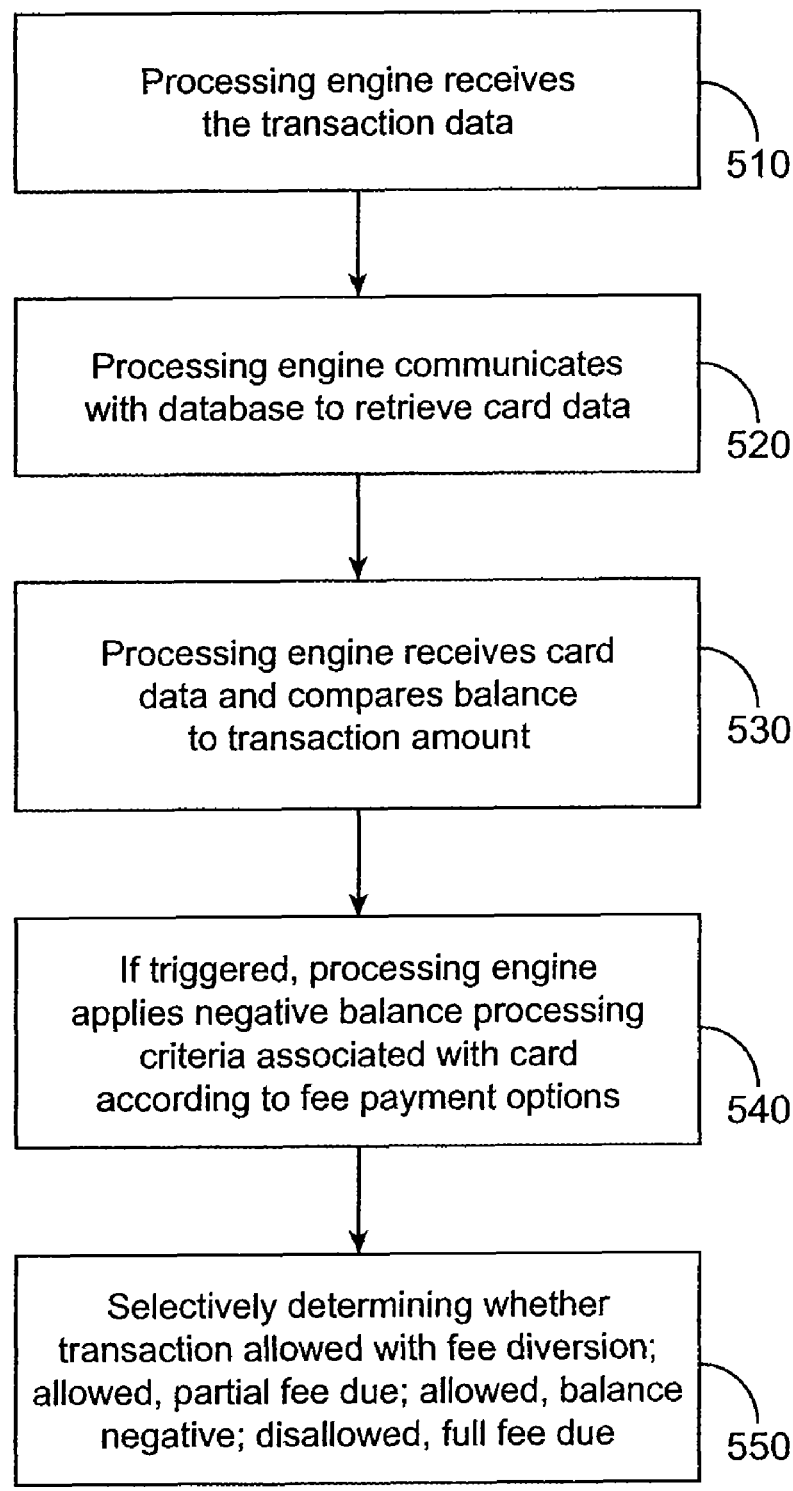
FIG. 5 illustrates an example of operations for negative balance processing associated with a prepaid card in accordance with one embodiment of the invention.

FIG. 5 illustrates an example of logical operations for negative balance processing. At operation 510, the transaction processing network receives the transaction data for a card and forwards the data to the processing engine. At operation 520, the processing engine communicates with the database and retrieves account data associated with the card. At operation 530, the processing engine receives the card data. The card data comprises the fee triggered by the transaction type and may further comprise criteria associated with the transaction type including negative balance processing criteria triggered by a negative balance event. The processing engine compares the card balance to the transaction amount after application of the fee. At operation 540, if triggered, the processing engine applies a negative balance processing criteria associated with the card. At operation 550, with respect to the transaction, the criteria may selectively determine allowance of the transaction with the fee diverted to an employer account; allowance of the transaction with partial fee due, for instance, the remaining balance on the account; allowance of the transaction with the account balance allowed to fall below zero; and disallowance of the transaction with full fee due. For each criteria, the processing network may further provide a report with respect to revenue lost/gained for each fee type and each fee configuration.

For example, applying the fee criteria, in a first option for each fee type, the issuer may configure the fee criteria to allow the transaction with the fee due diverted to an associated account. For example, for a transaction event of a $40 ATM withdrawal, the issuer configured the fee as $1.00 and further configured within the criteria that if the fee would cause the card balance to fall below zero, the fee should be diverted to a designated employer account. Accordingly, for a card having a balance of $40.50, because the $1.00 fee would cause the card balance to fall below zero, only the transaction amount of $40 would impact the card holder account and the $1.00 fee would be diverted to the employer account.

In a second option, for each fee type the issuer may configure the fee criteria to allow the transaction and allow the account balance to fall below zero. In this example, for a card balance of $40.50 and an ATM withdrawal event for $40 with a fee required of $1.00, the transaction and the fee would be applied to the account thereby allowing the account to fall below zero by $0.50. In a further embodiment, the prepaid card processing network may provide the issuer with a fee revenue report with respect to negative balance processing.

In a third option, for each fee type the issuer may configure the fee criteria to allow the transaction and dynamically adjust the fee to yield an account balance of zero. For example, for a transaction event of a $40 ATM withdrawal, the issuer may configure the fee for the event as $1.00 and further configure within the criteria that if the fee would cause the card balance to fall below zero, the fee may be dynamically adjusted to equal the remaining balance on the card. In this example, because the full fee would cause the balance to fall below zero, the fee may be adjusted to $0.50 thereby bringing the account balance to zero and allowing the issuer to collect at least a partial fee for the transaction event.

In an alternate embodiment, the fee may be configured to dynamically change the fee required to a predetermined partial fee amount. If there are insufficient funds in the card holder account for the preset partial fee, the fee may default to an alternate option for negative balance processing. For example, disallow the transaction or divert the fee as configured by the issuer.

In a further embodiment, for each fee type the issuer may configure the fee criteria to allow dynamic configuration of only certain fee types. For example, the issuer may allow dynamic adjustment of an ATM withdrawal fee but not an ATM inquiry fee. As one example, a card has a balance of $40.95. The transaction is an ATM withdrawal for $40 and the fee for the withdrawal should be $1.00. The cardholder makes an ATM withdrawal of $40. According to the fee criteria, the ATM fee associated with the transaction is $1.00. In the instance that the fee criteria is configured to allow dynamic adjustment of the ATM withdrawal fee, the prepaid card processing network may dynamically change the fee to $0.95 and allow the transaction thereby bringing the card balance to $0. However, subsequent to the transaction, if the card holder then places a request for a balance inquiry and the fee criteria is configured to disallow diversion or adjustment of fees for balance inquiries, because the balance is zero, the transaction would not be allowed.

In a fourth option, the fee criteria may be configured to require the full fee of $1.00. For example, for a cardholder balance of $40.95, a request for an ATM withdrawal of $40.00 associated with a fee for $1.00, would be denied due to insufficient funds. That is, because the transaction and fee exceeds the balance on the card, and the issuer configured the fee criteria to require the full fee amount for that fee type, the transaction would not be allowed. In a further embodiment, the prepaid card processing network may generate a fee income lost report to notify the issuer of lost revenue because the transaction was denied.

In one embodiment, as shown in FIG. 6, the fee detail may be accessed through a fee detail GUI. In various fields, card user information may be presented such as the program information associated with a card, the Issuer, the location, the fee table type, the fee information including fee ID, fee name and card type. Fields may further be provided to view triggering events, frequency, range type, reset period, fee starting point, fee applied, charge to (funding source). In another embodiment, the fields may be used to define fee ranges. For example, the first 1 to 5 triggering events are $2.00, the subsequent 6-10 triggering events are $4.00, and so on.

In a further embodiment, fields may be provided to define fee diversion including for example, frequency, reset period, and count to be diverted. In further embodiments, the negative balance option may be selected including for example, not applicable for this fee type, allow negative balance, disallow negative balance partial fee allowed, disallow negative balance full fee required. For instance, if an Issuer allows a negative balance, the requested activity may be allowed to take place without regard to the general ledger balance. As a result, the full fee is applied and the fee assessment operations may cause the general balance to become negative.

In another example, the Issuer elects to disallow a negative balance but allow a partial fee. In this instance, although the requested activity is allowed, the ledger balance is not allowed to fall below zero due to the fee assessment operations. As a consequence, only a portion or none of the fee may be assessed.

In a further example, the Issuer requires a full fee to be assessed. In this instance, depending on the definitions provided by the Issuer, the Authorization and Services transactions may be denied and other fee types may bypass charging the fee.

Through the authorization of certain transaction events in a negative balance processing situation, the issuer may benefit from significantly increased proceeds due to collection of partial fees, diverted fees and by allowing card balances to fall below the zero balance threshold. In various embodiments, the prepaid card processing network may further provide fee reports for each authorization type in order to enable the issuer to select the most profitable course of action for various transaction events and card balance situations.

Embodiments of the invention can be implemented via appropriate software or computer program code instructions in combination with appropriate instruction execution platforms, processor(s), hardware or the like. These instructions may be in the form of a computer program product that can cause a CPU to control operation of a processing engine according to an embodiment of the invention. The combination of hardware and software to perform the functions described can form the means to carry out the processes and/or subprocesses of embodiments of the invention. In this regard, each block in the flowcharts or block diagrams may represent a module, segment, action, or portion of code, which comprises one or more executable instructions or actions for implementing the specified logical function(s). Furthermore, an embodiment of the invention may take the form of a hardware embodiment, a software embodiment (including firmware, resident software, micro-code, etc.) or an embodiment combining software and hardware aspects.

Any suitable computer usable or computer readable medium may be used, taking into account that computer program code to operate a processing engine according to embodiments of the invention may reside at various places during assembly. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

In the context of this document, a computer usable or computer readable medium may be any medium that can contain, store, communicate, propagate, or transport the program for use by or in connection with an instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out embodiments of the present invention may be written in an object oriented, scripted or unscripted programming language such as but not limited to Java, Perl, Smalltalk, C++ or the like. However, the computer program code for carrying out embodiments of the present invention may also be written in conventional procedural programming languages, such as the "C" programming language or similar programming languages. It should also be noted that functions and combination of functions described herein can be implemented by special purpose hardware-based systems or operators which perform the specified functions or acts.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operation is not a limitation of the present invention.

It should be appreciated that reference throughout this specification to "one embodiment" or "an embodiment" or "one example" or "an example" means that a particular feature, structure or characteristic described in connection with the embodiment, may be included, if desired, in at least one embodiment of the present invention. Therefore, it should be appreciated that two or more references to "an embodiment" or "one embodiment" or "alternative embodiment" or "one example" or "an example" in various portions of this specification are not necessarily all referring to the same embodiment. Furthermore, the particular features, structures or characteristics may be combined as desired in one or more embodiments of the invention.

The invention claimed is:

1. An apparatus for negative balance processing of a prepaid card, comprising:
   a database for storing data related to a prepaid card account, and
   a processing engine for determining that sufficient funds are available in the account for a transaction amount associated with a transaction but that sufficient funds are not available in the account for the transaction amount plus an associated fee, and selectively determining whether the transaction is allowed, disallowed, allowed with a partial fee or allowed with a fee diverted, the processing engine in communications with the database.

2. The apparatus of claim 1, wherein the database associates at least one fee criteria with cardholder account data.

3. The apparatus of claim 1, wherein the processing engine is configured to divert the fee to one or more accounts associated with the prepaid card account.

4. The apparatus of claim 1, wherein the processing engine is configured to dynamically adjust the fee based on an amount by which there are insufficient funds in the account for the transaction amount plus the fee.

5. A method for processing a prepaid card, comprising:
   receiving transaction data from a transaction event associated with the prepaid card;
   determining, using a processor operatively connected with a memory, that sufficient funds are available in a prepaid card account for a transaction amount associated with the transaction event but that sufficient funds are not available in the account for the transaction amount plus a fee associated with the transaction event; and
   performing further processing based on the determination.

6. The method of claim 5, further comprising:
   accessing card holder data related to the prepaid card from a database, the data comprising at least a card balance.

7. The method of claim 6, wherein the card holder balance triggers application of a fee criteria for negative balance processing.

8. A method of claim 5, wherein the transaction data comprises one or more of a transaction type, a card holder name, a card identification, a card identification that identifies a fee criteria associated with the card, a merchant name and a merchant identifier.

9. A method of claim 5, further comprising:
   diverting the fee to one or more accounts associated with the prepaid card account.

10. A method of claim 5, further comprising:
    dynamically adjusting the fee based on an amount by which there are insufficient funds in the account for the transaction amount plus the fee.

11. A method of claim 10, further comprising:
    generating a report for lost/gained revenue based on the dynamic adjustment.

* * * * *